(12) United States Patent
Oda et al.

(10) Patent No.: US 9,181,122 B2
(45) Date of Patent: Nov. 10, 2015

(54) METHOD FOR PRODUCING GLASS PLATE

(75) Inventors: Hidetaka Oda, Shiga, PA (US);
Noritomo Nishiura, Shiga (JP); Koki Ueda, Shiga (JP); Tomonori Kano, Shiga (JP)

(73) Assignee: NIPPON ELECTRONICS GLASS CO., LTD., Shiga (JP)

( * ) Notice: Subject to any disclaimer, the term of this patent is extended or adjusted under 35 U.S.C. 154(b) by 110 days.

(21) Appl. No.: 13/818,358

(22) PCT Filed: Aug. 22, 2011

(86) PCT No.: PCT/JP2011/068829
§ 371 (c)(1),
(2), (4) Date: Feb. 22, 2013

(87) PCT Pub. No.: WO2012/026412
PCT Pub. Date: Mar. 1, 2012

(65) Prior Publication Data
US 2013/0152634 A1    Jun. 20, 2013

(30) Foreign Application Priority Data

Aug. 23, 2010 (JP) .................................. 2010-186051

(51) Int. Cl.
*C03B 25/12* (2006.01)
*C03B 17/06* (2006.01)

(52) U.S. Cl.
CPC ............... *C03B 25/12* (2013.01); *C03B 17/064* (2013.01); *C03B 17/065* (2013.01); *C03B 17/067* (2013.01)

(58) Field of Classification Search
CPC .. C03B 17/064; C03B 17/067; C03B 25/025; C03B 25/12

USPC .................................................. 65/90, 93, 95
See application file for complete search history.

(56) References Cited

U.S. PATENT DOCUMENTS

| | | | |
|---|---|---|---|
| 8,113,015 B2* | 2/2012 | Burdette | 65/93 |
| 8,196,431 B2* | 6/2012 | Burdette et al. | 65/29.14 |
| 8,656,737 B2* | 2/2014 | Nakamura et al. | 65/96 |
| 2008/0131651 A1* | 6/2008 | Burdette et al. | 428/98 |

(Continued)

FOREIGN PATENT DOCUMENTS

| | | |
|---|---|---|
| JP | 05-124826 | 5/1993 |
| JP | 2003-306340 | 10/2003 |

(Continued)

OTHER PUBLICATIONS

International Preliminary Report on Patentability and Written Opinion of the International Searching Authority issued Mar. 28, 2013 in International (PCT) Application No. PCT/JP2011/068829.
International Search Report issued Sep. 13, 2011 in International (PCT) Application No. PCT/JP2011/068829.

*Primary Examiner* — Jodi C Franklin
(74) *Attorney, Agent, or Firm* — Wenderoth, Lind & Ponack, L.L.P.

(57) ABSTRACT

In an annealing zone (3) of a glass sheet producing method, a curved portion (5) is formed by curving a glass ribbon (G) in a width direction, and a concavo-convex direction in a front and back direction of the curved portion (5) is reversed at least between an upper side and a lower side of a part of a region in the width direction of the glass ribbon (G). Therefore, a bending resistance in an upper and lower direction of the glass ribbon (G) and a bending resistance in the width direction of the glass ribbon (G) are increased.

8 Claims, 4 Drawing Sheets

(56) References Cited

U.S. PATENT DOCUMENTS

| | | | |
|---|---|---|---|
| 2009/0226733 A1* | 9/2009 | Kato et al. | 428/428 |
| 2010/0269542 A1* | 10/2010 | Nishiura et al. | 65/95 |
| 2010/0319402 A1* | 12/2010 | Burdette | 65/111 |
| 2011/0177287 A1* | 7/2011 | Kato et al. | 428/141 |
| 2012/0090357 A1* | 4/2012 | Nakamura et al. | 65/95 |
| 2013/0023400 A1* | 1/2013 | Koyama et al. | 501/67 |

FOREIGN PATENT DOCUMENTS

| | | |
|---|---|---|
| JP | 2008-019102 | 1/2008 |
| JP | 2009-173525 | 8/2009 |
| JP | 2010-511581 | 4/2010 |

* cited by examiner

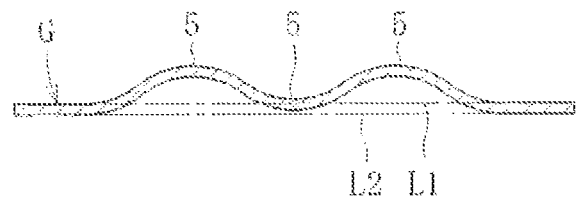
FIG. 6A
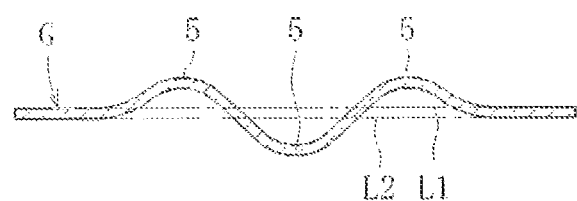
FIG. 6B
FIG. 7
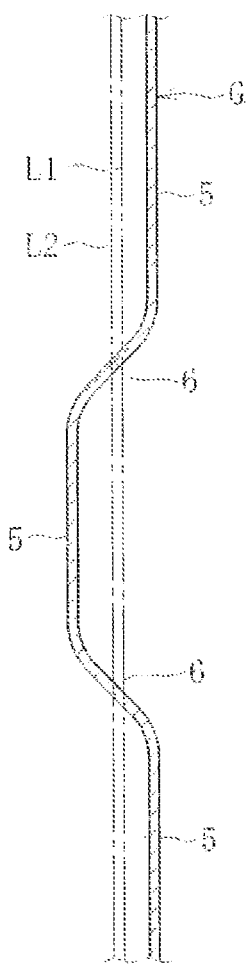

METHOD FOR PRODUCING GLASS PLATE

TECHNICAL FIELD

The present invention relates to a glass sheet producing method, and more particularly, to an improvement of a technology for producing glass sheets by a downdraw method in which glass sheets are produced by cutting a glass ribbon formed by causing molten glass to flow downward from a forming body into predetermined dimensions.

BACKGROUND ART

As a technology for producing glass sheets, the downdraw method has been publicly known, in which glass sheets are produced by forming a glass ribbon by causing molten glass to flow downward from a forming body and cutting the glass ribbon into predetermined dimensions. Typical examples of the downdraw method include an overflow downdraw method, a redraw method, and a slot downdraw method.

Forming methods using the downdraw methods of this type include, as basic steps of producing glass sheets, a forming step of forming a glass ribbon into a sheet-like shape (belt-like shape) having predetermined dimensions, an annealing step of annealing the glass ribbon so that internal distortion is removed; a cooling step of cooling the glass ribbon to about room temperature; and a cutting step of cutting the glass ribbon into predetermined dimensions.

Of those steps, at least the forming step and the annealing step are performed while the glass ribbon is moved downward.

In particular, of those steps, the annealing step is a step of removing internal distortion of the glass ribbon, and hence is an important step to determine product quality (performance) of the glass sheets. Specifically, when the internal distortion remains in the glass ribbon even after the annealing step, the internal distortion remains as it is also in the glass sheets produced by cutting the glass ribbon. As a result, a mechanical strength of the glass sheets may be significantly reduced, or disturbance of various characteristics, such as unintended birefringence, may occur. In particular, as for glass sheets for flat panel displays such as a liquid crystal display, the residual internal distortion causes the birefringence and the like. As a result, image quality is significantly deteriorated, which leads to serious problems.

Such problems with the residual internal distortion conspicuously occur when a glass ribbon is vibrated in a fluttering manner by ascending airflow generated in an annealing furnace and a posture of the glass ribbon is disturbed. This is because it is difficult to anneal the glass ribbon with a desired temperature distribution when the posture of the glass ribbon is disturbed in the annealing furnace.

Further, such disturbance of the posture of the glass ribbon in the annealing furnace may lead to not only the problems with the residual internal distortion but also a problem of irregular deflection of the glass ribbon, which may significantly deteriorate flatness of glass sheets as finished products.

As a countermeasure, for example, according to the disclosure of Patent Literature 1, convection preventing plates are arranged for preventing ascending airflow in the annealing furnace. However, gaps between the convection preventing plates and the glass ribbon cannot be completely closed, and hence the ascending airflow has much influence on the glass ribbon. In addition, when the glass ribbon and the convection preventing plates are brought close to each other, there may arise an additional problem that the glass ribbon is broken by abutment against the convection preventing plates when the ascending airflow disturbs the posture of the glass ribbon by vibrating the glass ribbon.

Further, according to the disclosure of Patent Literature 2, air pressure of an atmosphere on an outside of the annealing furnace is increased to prevent generation of the ascending airflow in the annealing furnace without use of the convection preventing plates. However, even when such a countermeasure is taken, it is difficult to completely prevent the ascending airflow.

Note that, according to the disclosure of Patent Literature 3, although the above-mentioned ascending airflow is not directly coped with, the glass ribbon caused to flow downward from the forming body is actively curved into a partial cylindrical surface shape over a width direction.

CITATION LIST

Patent Literature 1: JP 05-124826 A
Patent Literature 2: JP 2009-173525 A
Patent Literature 3: JP 2010-511581 A

SUMMARY OF INVENTION

Technical Problems

By the way, as in the disclosure of Patent Literature 3, when the glass ribbon is curved into the partial cylindrical surface shape over the width direction in advance, such a glass ribbon is less liable to be deformed in comparison with a completely flat glass ribbon. Thus, an effect of preventing a situation in which the ascending airflow generated in the annealing furnace disturbs the posture of the glass ribbon can be expected to some extent.

However, when the glass ribbon is curved into the partial cylindrical surface shape over the width direction, although the curve prevents the glass ribbon from being bent in an upper and lower direction, the glass ribbon is still liable to be bent in the width direction. Thus, when the ascending airflow acts on the glass ribbon thus curved, the glass ribbon may be vibrated while being repeatedly deformed in the width direction. In this way, the posture of the glass ribbon may be disturbed.

Further, the glass ribbon curved into the partial cylindrical surface shape can be easily developed into a planer shape, and hence may be restored to a planer shape by influence of the ascending airflow. When such a situation occurs, the glass ribbon is liable to be influenced by the ascending airflow again, with the result that the disturbance of the posture becomes more conspicuous.

Under the above-mentioned circumstances, a technical object of the present invention is to suppress the disturbance of the posture of the glass ribbon in the annealing step as much as possible, and to reliably remove the internal distortion and the deflection of the glass ribbon.

Solution to Problems

According to the present invention which has been made to solve the above-mentioned problems, there is provided a glass sheet producing method, comprising the steps of: forming a glass ribbon into a sheet-like shape; annealing the glass ribbon so that internal distortion of the glass ribbon is removed; cooling the glass ribbon to about room temperature; and cutting the glass ribbon into predetermined dimensions, at least the forming and the annealing being performed along with downward movement of the glass ribbon, wherein the annealing comprises: forming a curved portion by curving the glass ribbon in a width direction; and reversing a concavo-convex direction in a front and back direction of the curved portion at least between an upper side and a lower side of a part of a region in the width direction of the glass ribbon, to thereby increase a bending resistance in an upper and lower direction of the glass ribbon and a bending resistance in the width direction of the glass ribbon.

According to such a method, in the annealing of the glass ribbon so that the internal distortion of the glass ribbon is removed, the glass ribbon includes the curved portion that is curved in the width direction, and the concavo-convex direction in the front and back direction of the curved portion is reversed at least between the upper side and the lower side of the part of the region in the width direction of the glass ribbon. With this, the bending resistance in the upper and lower direction of the glass ribbon and the bending resistance in the width direction of the glass ribbon are increased. As a result, even when ascending airflow acts on the glass ribbon in the annealing, the glass ribbon having the higher bending resistances is less liable to be deformed, and hence can be maintained in a stable posture.

In the above-mentioned method, it is preferred that the concavo-convex direction in the front and back direction of the curved portion be reversed with respect to the width direction of the glass ribbon.

With this, the bending resistance in the upper and lower direction of the glass ribbon and the bending resistance in the width direction of the glass ribbon are further increased. Thus, the posture of the glass ribbon is less liable to be disturbed by the ascending airflow.

In the above-mentioned method, a maximum curve amount of the curved portion ranges preferably from 1 mm to 50 mm, more preferably from 5 mm to 30 mm, even more preferably from 10 mm to 20 mm, assuming that a curve amount of the curved portion is represented by a vertical clearance from an imaginary straight line as a reference position of a zero curve amount, the imaginary straight line connecting both widthwise end portions of the glass ribbon to each other.

Specifically, when the maximum curve amount of the curved portion is less than 1 mm, a shape of the glass ribbon may become flatter, with the result that advantages of the higher bending resistances may not be sufficiently obtained. Meanwhile, when the maximum curve amount of the curved portion exceeds 50 mm, the glass ribbon is largely curved, and hence the advantages of the higher bending resistances may be reliably obtained. However, residual curve of glass sheets produced by cutting the glass ribbon may be excessively large. As a countermeasure, it is preferred to set the maximum curve amount of the curved portion of the glass ribbon to fall within the above-mentioned numerical ranges. Within those ranges, the residual curve of the glass sheets to be produced can be suppressed to that of products at an acceptable level while the bending resistances of the glass ribbon are maintained sufficiently high.

In the above-mentioned method, the curved portion may be formed by applying a mechanical external force to the glass ribbon, and may be formed by annealing the glass ribbon at temperatures set to be different from each other between a front surface side of the glass ribbon and a back surface side of the glass ribbon.

In the above-mentioned method, a thickness of the glass ribbon is preferably 2 mm or less, more preferably 1 mm or less, even more preferably 700 µm or less.

Specifically, as the thickness of the glass ribbon increases, the glass ribbon itself is less liable to be deformed. Thus, the posture is less liable to be disturbed by the ascending airflow generated in the annealing. In other words, as the thickness of the glass ribbon decreases, the problems of the internal distortion and the deflection of the glass ribbon are liable to occur by influence of disturbance of the annealing temperature in the annealing. Such problems are particularly liable to occur when the thickness of the glass ribbon falls within the above-mentioned numerical ranges, and hence utility of the invention of the present application becomes higher. Further, when the thickness of the glass ribbon is reduced to fall within the above-mentioned numerical ranges, there is an advantage that the concavo-convex direction can be easily reversed.

Advantageous Effects of Invention

As described above, according to the present invention, in the annealing, the glass ribbon is curved in the width direction so that the curved portion is formed, and the concavo-convex direction in the front and back direction of the curved portion is reversed at least between the upper side and the lower side of the part of the region in the width direction of the glass ribbon. With this, the bending resistance in the upper and lower direction of the glass ribbon and the bending resistance in the width direction of the glass ribbon can be increased. With the higher bending resistances, the disturbance of the posture of the glass ribbon in the annealing can be suppressed as much as possible. As a result, in the annealing, the glass ribbon can be annealed under a stable temperature condition, and hence the internal distortion and the deflection of the glass ribbon can be reliably removed.

BRIEF DESCRIPTION OF DRAWINGS

FIG. 6A A horizontal sectional view of a glass ribbon according to a modification in the annealing zone.

FIG. 6B A horizontal sectional view of a glass ribbon according to another modification in the annealing zone.

FIG. 7 A vertical sectional view of a glass ribbon according to still another modification in the annealing zone.

DESCRIPTION OF EMBODIMENT

In the following, description is made of an embodiment of the present invention with reference to the accompanying drawings.

Figure 1:
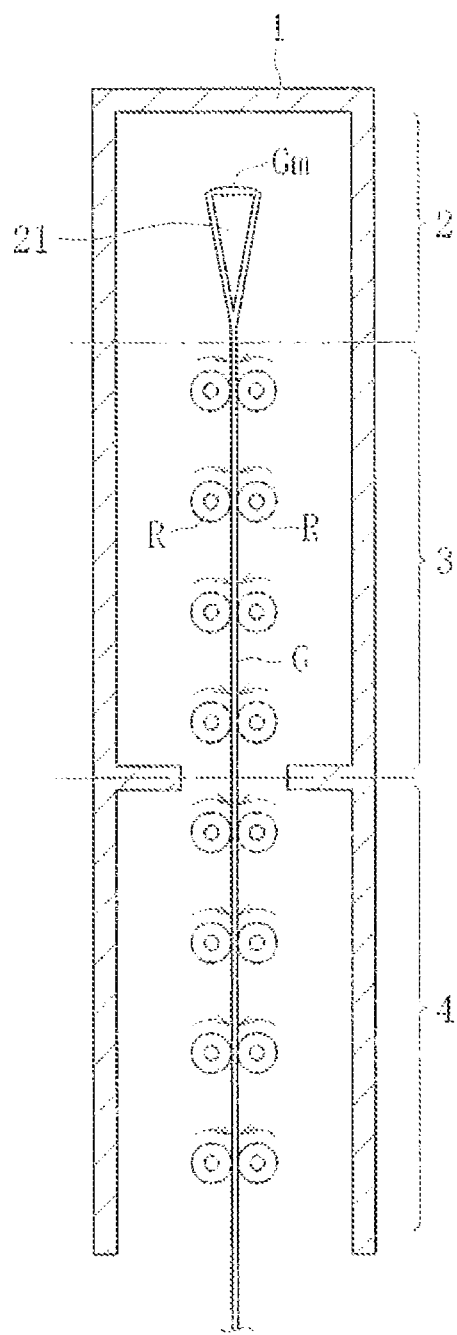
FIG. 1 A vertical sectional view of a main part of a glass sheet producing apparatus for embodying a glass sheet producing method according to an embodiment of the present invention.

FIG. 1 is a vertical sectional view of a main part of a producing apparatus for embodying a glass sheet producing method according to this embodiment. This producing apparatus is configured to form a sheet-shaped glass ribbon G to be produced as glass sheets in a furnace 1 by an overflow downdraw method. Note that, a thickness of the glass ribbon G is 2 mm (preferably 1 mm, more preferably 700 µm) or less, and the glass sheets produced by cutting the glass ribbon G are utilized, for example, as the following: flat panel displays such as a liquid crystal display, a plasma display, and an OLED display; glass substrates for devices such as a solar cell, a lithium-ion battery, a digital signage, a touch panel, and electronic paper; cover glasses for OLED illumination devices and the like; glass containers for medicines; sheet glass windows; and lightweight laminated glass windows.

Specifically, in the following order from the top, the furnace 1 comprises therein a forming zone 2 in which a forming step is performed, an annealing zone 3 in which an annealing step is performed, and a cooling zone 4 in which a cooling step is performed. Although not shown, the furnace 1 further comprises a cutting zone in which a cutting step is performed.

In the forming zone 2, molten glass Gm is supplied into a forming body 21 having a wedge-like shape in cross section. Then, the molten glass Gm having overflowed from the top of the forming body 21 is fused at a lower end portion thereof, and then is caused to flow downward. In this way, the sheet-shaped glass ribbon G is formed from the molten glass Gm. In the annealing zone 3, the glass ribbon G formed in the forming zone 2 is annealed to remove internal distortion thereof. In the cooling zone 4, the glass ribbon G annealed in the annealing zone 3 is cooled to about room temperature. Then, the glass ribbon G thus cooled is cut into a predetermined size in the cutting zone (not shown). In this way, glass sheets are successively produced.

Figure 2:
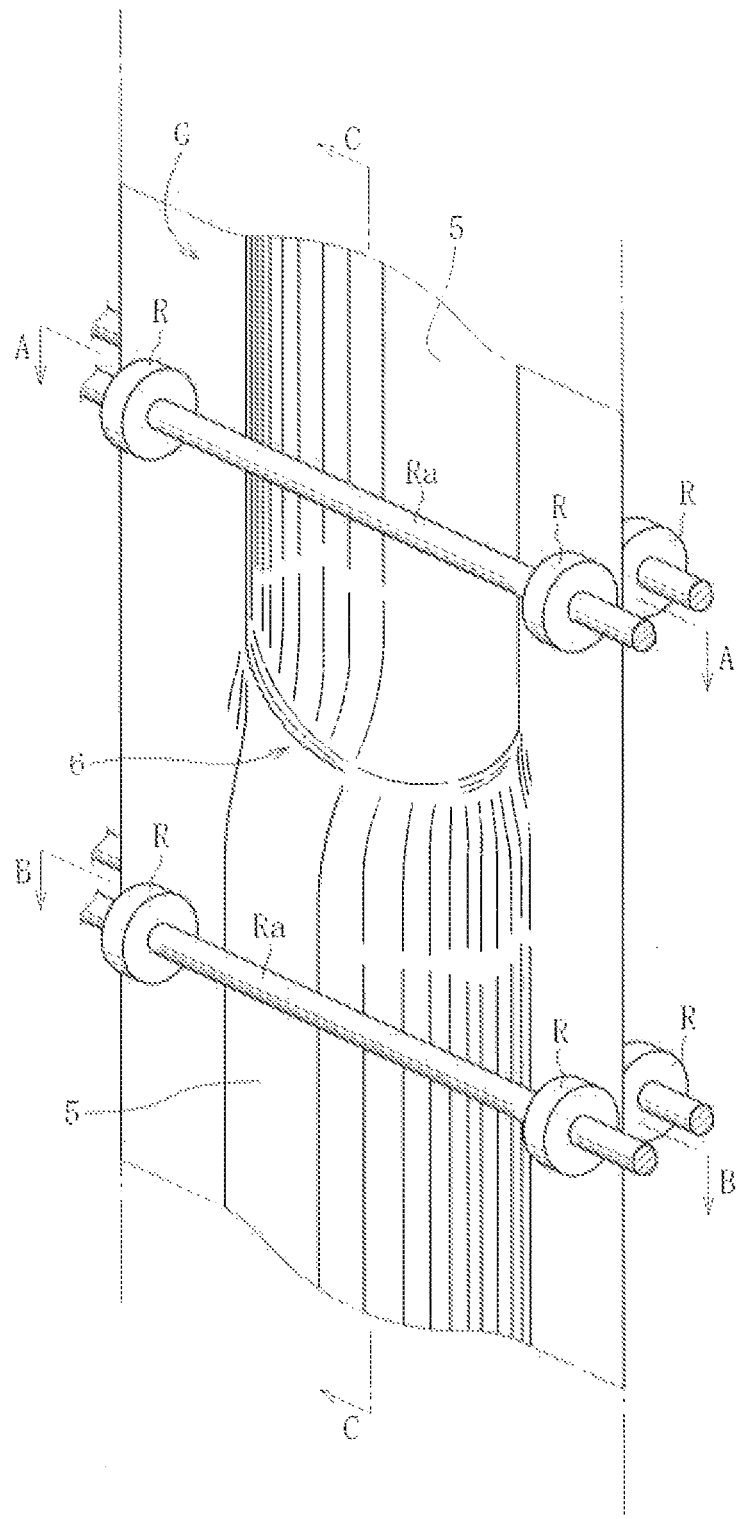
FIG. 2 A perspective view illustrating a state of a glass ribbon in an annealing zone in FIG. 1.

Note that, in the annealing zone 3 and the cooling zone 4, at a plurality of points from an upstream side to a downstream side in a conveyance path of the glass ribbon G, roller units each comprising a pair of rollers R each rolled in a direction indicated by an arrow in FIG. 1 are arranged. As illustrated in FIG. 2, the pair of rollers R of each of the roller units comprises two pairs of rollers R for respectively sandwiching both widthwise end portions of the glass ribbon G. In this embodiment, two rollers R existing on one side of the glass ribbon G and two rollers R existing on another side thereof are fixed by being coupled respectively to two roller shafts Ra. As a matter of course, it is not necessary to fix and couple the rollers R on the one side and the rollers R on the another side to each other with the roller shafts Ra, and the rollers R each may be supported in a cantilever manner by a roller shaft.

Here, in the furnace 1, the outside air is sucked from a lower end opening of the furnace 1 by what is called a chimney effect, with the result that much ascending airflow is generated. Conventionally, various countermeasures have been taken to prevent such ascending airflow, such as increasing pressure on an inside of the furnace 1 with respect to pressure on an outside of the furnace 1. However, even with such countermeasures, it is difficult to completely prevent the ascending airflow. When such ascending airflow is generated, the glass ribbon G in the furnace 1 may be vibrated in a fluttering manner, which leads to a risk of disturbance of a posture. In a case where the posture of the glass ribbon G is disturbed in the annealing zone 3, the glass ribbon G may be insufficiently annealed, which leads to a risk of deterioration in performance of the glass sheets produced by cooling and then cutting the glass ribbon G.

In this embodiment, as illustrated in FIG. 2, in the annealing zone 3, the glass ribbon G is not maintained flat but curved to some extent so that the posture of the glass ribbon G is prevented from being disturbed by the above-mentioned ascending airflow.

Specifically, the glass ribbon G is curved in a width direction to form a curved portion 5, and a concavo-convex direction in a front and back direction of the curved portion 5 is reversed at least between an upper side and a lower side of a part of the curved portion 5 with respect to the width direction of the glass ribbon G.

Figure 3:
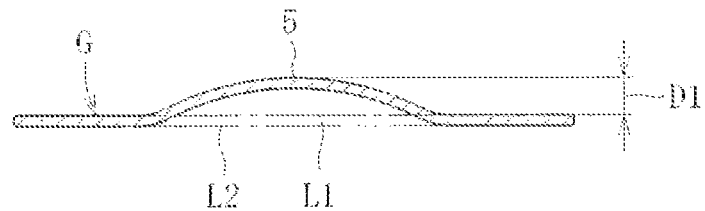
FIG. 3 A sectional view taken along the line A-A of FIG. 2.

In this embodiment, as illustrated in FIG. 3, a curved portion 5 located on an upstream side in the annealing zone 3 is formed by curving a central portion in the width direction of the glass ribbon G so that the central portion is convexed toward a surface on one side (hereinafter referred to as back surface). A maximum curve amount D1 of the curved portion 5 on the upstream side is represented by a vertical clearance from an imaginary straight line L1 as a reference position of a zero curve amount, the imaginary straight line L1 connecting both the widthwise end portions of the glass ribbon G to each other. In this case, the maximum curve amount D1 ranges from 1 mm to 50 mm (preferably from 5 mm to 30 mm, more preferably from 10 mm to 20 mm). Note that, the dashed lines (L1 and L2) in FIG. 3 indicate a state of the glass ribbon G in a case where the curved portion 5 is not formed, in other words, a state of the flat glass ribbon G. The same applies to FIGS. 4 to 7.

Figure 4:
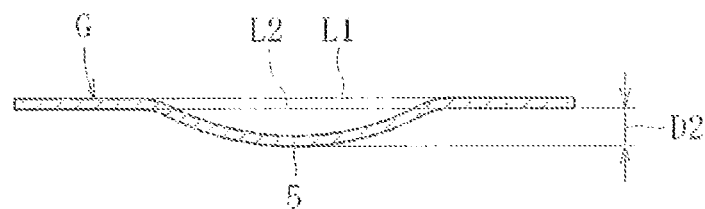
FIG. 4 A sectional view taken along the line B-B of FIG. 2.

Meanwhile, as illustrated in FIG. 4, a curved portion 5 located on a downstream side in the annealing zone 3 is formed by curving the central portion in the width direction of the glass ribbon G so that the central portion is convexed toward a surface on another side (hereinafter referred to as front surface). A maximum curve amount D2 of the curved portion 5 on the downstream side is similarly represented by a vertical clearance from an imaginary straight line L2 as a reference position of a zero curve amount, the imaginary straight line L2 connecting both the widthwise end portions of the glass ribbon G to each other. In this case, the maximum curve amount D2 ranges from 1 mm to 50 mm (preferably from 5 mm to 30 mm, more preferably from 10 mm to 20 mm).

Figure 5:
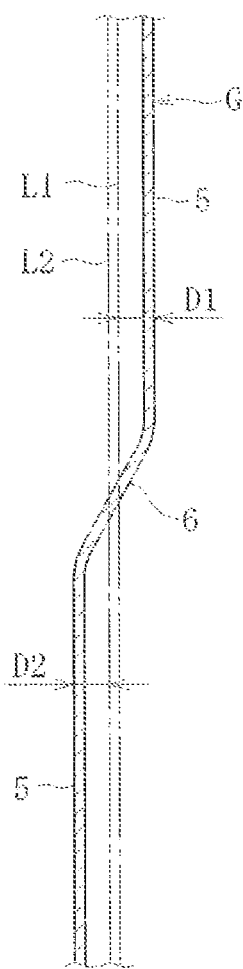
FIG. 5 A sectional view taken along the line C-C of FIG. 2.

As illustrated in FIGS. 3 and 4, convex directions of the respective curved portions 5 on the upstream side and the downstream side are reversed to each other between the upstream side and the downstream side. Specifically, a convex on the back surface side of the glass ribbon G is formed on the upstream side, and a convex on the front surface side of the glass ribbon G is formed on the downstream side. With this, as illustrated in FIG. 5, the glass ribbon G is curved also in an upper and lower direction in a manner that directions of convex sides of the respective curved portions 5 on the upstream side and the downstream side are reversed to each other between the back surface side and the front surface side with respect to a reversed portion 6.

Thus, bending resistances in the upper and lower direction and the width direction of the glass ribbon G are relatively higher than those in a case where the glass ribbon G is maintained flat or curved only in the width direction (for example, formed into a partial cylindrical surface shape). This is because the curved portion 5 is formed by curving the glass ribbon G over the width direction, and hence functions as resistance for preventing the glass ribbon G from being deformed by being bent in the upper and lower direction, which leads to an increase of the bending resistance in the upper and lower direction. Further, this is also because the directions of the convex sides of the curved portions 5 are reversed to each other between the upper side and the lower side of the glass ribbon G, and hence the reversed portion 6 therebetween functions as resistance for preventing the glass ribbon G from being deformed by being bent in the width direction, which leads to an increase of the bending resistance in the width direction. Therefore, deformation is less liable to occur under a state in which a shape of the glass ribbon G in the annealing zone 3 is substantially secured. In this way, even when ascending airflow is generated in the annealing zone 3, it is possible to reliably avoid a trouble that the ascending airflow disturbs the posture of the glass ribbon G. As a result, in the annealing zone 3, the glass ribbon G can be annealed under a stable temperature condition, and hence internal distortion of the glass ribbon G can be reliably removed.

Here, as illustrated in FIG. 2, the glass ribbon G comprising the curved portion 5 is sequentially moved downward, and hence, in the annealing zone 3, it is necessary to sequentially form curved portions 5 with respect to the glass ribbon G successively supplied from the forming zone 2. Examples of the method of forming the curved portions 5 (including the reversed portion 6) with respect to the glass ribbon G comprise the following method.

Specifically, the curved portion 5 may be formed by deforming the glass ribbon G into the shape illustrated in FIG. 2 with a mechanical external force. More specifically, for example, the curved portion 5 may be formed by forcibly deforming the glass ribbon G through a contact jig (not shown) against the glass ribbon G. Alternatively, the curved portion 5 may be formed by arranging some of the roller units arranged in the annealing zone 3 in a biased manner on one side in the front and back direction of the glass ribbon G with respect to straight lines on which other roller units are arrayed so that the glass ribbon G is guided in a meandering manner. Still alternatively, the curved portion 5 may be formed by setting a speed of pulling by roller units on the downstream side to be temporarily lower than a speed of pulling by roller units on the upstream side so that the glass ribbon G is deflected between the roller units on the upstream side and the roller units on the downstream side.

Yet alternatively, the curved portion 5 may be formed with temperature distributions set to be different from each other between the front surface side and the back surface side of the glass ribbon G in the annealing zone 3. Specifically, the curved portion 5 may be formed due to variation in thermal deformation (expansion and shrinkage) obtained by arranging heaters at positions corresponding respectively to the front surface side and the back surface side of the glass ribbon G in the annealing zone 3 so that a heating temperature of the heater on the front surface side and a heating temperature of the heater on the back surface side are set to be slightly different from each other. Specifically, an annealing temperature on a surface on the convex side of a curve of the curved portion 5 is set to be lower than an annealing temperature on a surface on an opposite concave side thereof, for example, by from 1° C. to 50° C.

Note that, it suffices that the curved portion 5 is formed with respect to the glass ribbon G at least in the annealing zone 3 as described above, and the curved portion 5 may be cleared from the glass ribbon G, for example, in the cooling zone 4 and the cutting zone subsequent to the annealing zone 3. Further, even when the curved portion 5 remains, a curve amount of the glass sheets produced by cutting the glass ribbon G is smaller than a curve amount in a state of the glass ribbon G, and hence there are no practical problems.

The present invention is not limited to the above-mentioned embodiment, and various modifications may be made thereto without departing from the spirit of the present invention. For example, in the above-mentioned embodiment, as illustrated in FIGS. 3 and 4, description is made on a case where the glass ribbon G is curved only once in the width direction at the same position in the upper and lower direction. Alternatively, as illustrated in FIGS. 6A and 6B, the glass ribbon G may be curved a plurality of times in the width direction at the same position in the upper and lower direction, and the direction of the convex (concave) side of the curved portion 5 may also be reversed one or more times with respect to the width direction. In this case, a maximum curve amount of the curved portions 5 convexed (concaved) on the back surface side of the glass ribbon G and a maximum curve amount of the curved portions 5 convexed (concaved) on the front surface side thereof may be set to be different from each other as illustrated in FIG. 6A, or may be set to be approximately equal to each other as illustrated in FIG. 6B. Alternatively, the curved portions 5 on the upstream side and the curved portions 5 on the downstream side may be different from each other in number of curving times in the width direction.

Further, in the above-mentioned embodiment, as illustrated in FIG. 5, description is made on a case where the glass ribbon G is curved only once in the upper and lower direction at the same position in the width direction so that the reversed portion 6 is formed at one point. Alternatively, as illustrated in FIG. 7, the glass ribbon G may be curved a plurality of times in the upper and lower direction at the same position in the width direction so that reversed portions 6 are formed at a plurality of points.

Still further, in the above-mentioned embodiment, description is made of a case where the glass ribbon is formed by an overflow downdraw method. Alternatively, for example, the glass ribbon may be formed by other downdraw methods such as a slot downdraw method and a redraw method.

REFERENCE SIGNS LIST 1 furnace
2 forming zone
3 annealing zone
4 cooling zone
5 curved portion
6 reversed portion
G glass ribbon

The invention claimed is:

1. A glass sheet producing method, comprising the steps of:
    forming a glass ribbon into a sheet-like shape;
    sandwiching widthwise edge portions of the glass ribbon with roller units;
    annealing the glass ribbon so that internal distortion of the glass ribbon is removed;
    cooling the glass ribbon to about room temperature; and
    cutting the glass ribbon into predetermined dimensions,
        at least the forming and the annealing being performed along with downward movement of the glass ribbon,
    wherein the annealing comprises:
        forming a curved portion by curving the glass ribbon in a width direction by setting a speed of pulling the glass ribbon by a roller unit of the roller units that is at a downstream side of the glass ribbon to be temporarily lower than a speed of pulling the glass ribbon by a roller unit of the roller units that is at an upstream side of the glass ribbon; and
        reversing a concavo-convex direction of the curved portion in a front and back direction of the glass ribbon at least between an upper side and a lower side of a part of a region in the width direction of the glass ribbon, to thereby increase a bending resistance in an upper and lower direction of the glass ribbon and a bending resistance in the width direction of the glass ribbon.

2. The glass sheet producing method according to claim 1, wherein the concavo-convex direction in the front and back direction of the curved portion is reversed with respect to the width direction of the glass ribbon.

3. The glass sheet producing method according to claim 1, wherein a maximum curve amount of the curved portion ranges from 1 mm to 50 mm, assuming that a curve amount of the curved portion is represented by a vertical clearance from an imaginary straight line as a reference position of a zero curve amount, the imaginary straight line connecting both widthwise end portions of the glass ribbon to each other.

4. The glass sheet producing method according to claim 1, wherein a thickness of the glass ribbon is 2 mm or less.

5. The glass sheet producing method according to claim 2, wherein a maximum curve amount of the curved portion ranges from 1 mm to 50 mm, assuming that a curve amount of the curved portion is represented by a vertical clearance from an imaginary straight line as a reference position of a zero curve amount, the imaginary straight line connecting both widthwise end portions of the glass ribbon to each other.

6. The glass sheet producing method according to claim 2, wherein a thickness of the glass ribbon is 2 mm or less.

7. The glass sheet producing method according to claim 3, wherein a thickness of the glass ribbon is 2 mm or less.

8. The glass sheet producing method according to claim 5, wherein a thickness of the glass ribbon is 2 mm or less.

* * * * *